United States Patent [19]
Klein

[11] Patent Number: 5,687,555
[45] Date of Patent: Nov. 18, 1997

[54] APPARATUS FOR MOWING, AERATING, AND/OR COLLECTING

[75] Inventor: Laurent Klein, Spicheren, France

[73] Assignee: Amazone Machines Agricoles S.A., Forbach, France

[21] Appl. No.: 559,287

[22] Filed: Nov. 15, 1995

[30] Foreign Application Priority Data

Nov. 15, 1994 [DE] Germany .................. 44 40 825.0

[51] Int. Cl.$^6$ .................................. A01D 34/64
[52] U.S. Cl. .................. 56/249; 56/15.8; 56/15.9; 56/17.1
[58] Field of Search .................. 56/15.2, 15.6, 56/15.7, 15.8, 15.9, 16.2, 17.4, 13.3, 13.6, 202, 208, 249, DIG. 9, DIG. 10, DIG. 22, 7, 294, 299

[56] References Cited

U.S. PATENT DOCUMENTS

| | | |
|---|---|---|
| 3,077,065 | 2/1963 | Samways et al. |
| 4,715,168 | 12/1987 | Oxley ............................. 56/15.9 |
| 4,760,686 | 8/1988 | Samejima et al. ............. 56/15.9 X |
| 5,129,218 | 7/1992 | Youngberg et al. ............. 56/15.8 |
| 5,355,664 | 10/1994 | Zenner ............................. 56/15.8 |
| 5,410,865 | 5/1995 | Kurohara et al. ............... 56/15.9 |

FOREIGN PATENT DOCUMENTS

| | | |
|---|---|---|
| 0 245 824 | 11/1987 | European Pat. Off. ....... A01D 34/66 |
| 0 344 128 | 11/1989 | European Pat. Off. ....... A01D 34/64 |
| 0377962 | 7/1990 | European Pat. Off. ....... A01D 67/00 |
| 1 507 423 | 12/1969 | Germany . |
| 25 43 305 | 4/1977 | Germany ....................... A01D 35/24 |
| 3232743 | 3/1983 | Germany ....................... A01B 71/06 |
| 4238603 | 5/1994 | Germany ....................... A01B 63/111 |
| 2 048 638 | 12/1980 | United Kingdom ........... A01D 35/00 |
| 2239637 | 7/1991 | United Kingdom ........... B62D 49/00 |

*Primary Examiner*—Terry Lee Melius
*Assistant Examiner*—Robert Pezzuto
*Attorney, Agent, or Firm*—Horst M. Kasper

[57] ABSTRACT

An apparatus for mowing, aerating and/or collecting includes a cultivation device, formed preferably as a mowing assembly, and disposed movable in a vertical direction relative to the frame, with guide elements disposed in front of and behind the cultivation device and adjustable relative to the cultivation device for setting the cutter level or the operating level of the cultivation device. In order to allow a uniform distance guide of the mowing assembly relative to the ground surface, even in case of an extremely uneven terrain, it is provided that the guide elements, disposed in front of and behind the cultivation device, are disposed at at least one common traverse. The traverse is disposed and swivelable in an upwardly aligned plane around a horizontally disposed axis, running perpendicular to the direction of travel.

17 Claims, 6 Drawing Sheets

APPARATUS FOR MOWING, AERATING, AND/OR COLLECTING

BACKGROUND OF THE INVENTION

1. Field of the Invention

The invention relates to an apparatus for mowing, aerating and/or collecting including a cultivation device formed as a mowing assembly and movably disposed in a vertical direction and relative to the frame.

2. Brief Description of the Background of the Invention Including Prior Art

Such devices are known to the practitioner. These mower machines exhibit a frame, where a mowing assembly is disposed movable in a vertical direction. Guide elements are disposed in front of and behind this mowing assembly and are adjustable relative to the mowing assembly for adjusting the cutting level of the mowing assembly. The front guide elements and the rear guide elements are in each case individually attached immediately at the mowing assembly and are adjustable in their height level. In case of an uneven terrain, the height level guide of the cutter knife of the mowing assembly is performed by the front guide elements or the rear guide elements and, in case of extreme terrain unevenness, when the relative motion of the mowing assembly relative to the vehicle frame is insufficient, by the carrier vehicle supporting the mowing assembly. This leads in connection with the known rigid connection of the front guide elements and of the rear guide elements relative to the mowing assembly to the situation that the mowing assembly exhibits in case of a rising ground unevenness initially too large a distance to the ground and thus the desired cutting length of the remaining plants becomes undesirably long. In case of a downwardly sloping ground unevenness, the rear support element assumes the support carrier function such that the mowing assembly is held high for too long a time and thus the cutting length of the lawn area becomes also undesirably short. In addition, the protective effect of the side parts of the mowing assembly is partly decreased in an impermissible way by the enlargement of the space distance between the ground and the mowing assembly based on the distance change of the mowing assembly relative to the ground.

SUMMARY OF THE INVENTION

1. Purposes of the Invention

It is an object of the present invention to improve a mower machine with a cultivation device, formed preferably as a mowing assembly, where an adjustment of the cutting level can be performed in a simple way to allow a uniform distance guidance of the mowing assembly relative to the ground surface even in cases of extremely uneven terrains.

These and other objects of and advantages of the present invention will become evident from the description which follows.

2. Brief Description of the Invention

According to the present invention, there is provided for an apparatus for mowing, aerating and/or collecting. A cultivation device is disposed movably in a vertical direction relative to a frame. An adjustable front guide element is disposed in front of the cultivation device and a rear guide element is disposed in rear of and behind the cultivation device. The adjustable front guide element and the rear guide element set an operating level of the cultivation device. A control mechanism is attached to the frame. A second axis is running perpendicular to a direction of travel of the apparatus and is supported by the control mechanism in an area of the cultivation device such that a vertical position of the second axis can be set with the control mechanism. A common traverse is disposed between the front guide element and the adjustable rear guide element and is pivotably attached for pivoting around the second axis. The adjustable front guide element and the rear guide element are rotatably supported by the common traverse.

The cultivation device can be a mowing assembly. The control mechanism can be provided with a two-armed lever, with one arm of the two-armed lever employed for position adjustment and with the second arm of the two-armed lever supporting the second axis.

The second axis can be disposed horizontally and the second axis can coincide with a rotation axis of the mower drum.

The second axis can be disposed below a rotation axis of the mower drum and about vertically below the rotation axis.

The operating level of the cultivation device can be a cutter level. A position of the second axis can be adjusted in a vertical direction for an adjustment of the cutter level.

The common traverse can be hinged in a bearing representing the second axis located at a swivel arm pivoting around the first axis. A position of the swivel arm can be adjusted direction with the control mechanism.

A second common traverse can be disposed between the front guide element and the adjustable rear guide element and can be pivotably attached for pivoting around the second axis. The adjustable front guide element and the rear guide element are rotatably supported by the second common traverse. The first common traverse and the second common traverse can be pivoted independently of each other around the second axis disposed horizontally.

The traverse can be provided with such a structure that the traverse serves as a protective element against extraneous bodies exiting sideways and as a distance spacer to prevent any danger of injury.

Even in case of an extreme unevenness of the ground of the area to be mowed, it is assured in a surprisingly simple way that the mowing assembly is led and guided at a uniform distance relative to the ground surface such that the lawn area can be mowed uniformly and such that the cutting length of the grass is uniform after the mowing.

The axis, around which the traverse pivots, can coincide with the rotation axis of the mower drum or can be disposed below the rotation axis of the mower drum and about vertical relative to said rotation axis.

In order to achieve the desired cutting height level, it is provided that the axis around which the traverse pivots is adjustable in a vertical direction for adjusting the cutting height level.

In order to achieve an adaptation as exact as possible of the mowing assembly to uneven ground surfaces, which can also drop at an inclined angle relative to the direction of travel of the mower apparatus, it is provided that the traverses are pivotable around the axis independently of each other, where the traverses are disposed in each case on the side of the mowing assembly, and where the traverses support the depth guide elements setting the distance between the mowing assembly and the ground surface.

Based on the suspension at the mowing assembly according to the present invention of the traverses supporting the guide elements, it is in addition possible to guide the protective elements at a small constant distance relative to the ground surface. In this context, the traverse itself and/or the parts disposed at the traverse can be formed such that they serve as a protective element against extraneous bodies which are thrown out at the side or which are exiting at the side, and serve as a distance spacer against the possibility or danger of injury.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

According to the present invention, there is provided for an apparatus for mewing, aerating and/or collecting including a cultivation device formed as a mowing assembly, and disposed movably in a vertical direction relative to the frame. Guide elements are disposed in front of and behind the cultivation device, and are adjustable relative to the cultivation device for setting an operating level of the cultivation device. The guide elements, disposed in front of the cultivation device and the guide elements disposed behind the cultivation device, are disposed at at least one common traverse 17. The traverse 17 is disposed between the guide elements 11, 12 at the cultivation device 7 and is swivelable in an upwardly aligned plane around a horizontally disposed axis 19, running perpendicular to the direction of travel 18.

The horizontally disposed axis 19 can coincide with the rotation axis 14 of the mower drum 8.

The axis 19 can be disposed below the rotation axis 14 of the mower drum 8 and about vertically relative to the rotation axis 14.

The operating level of the cultivation device can be a cutter level. The axis 19 can be adjusted in a vertical direction for an adjustment of the cutter level.

The traverses 17 can be hinged in each case at a swivel arm 20. The swivel arm 20 can be adjusted in a vertical direction with a control mechanism 25.

The traverses 17 can be pivoted independent of each other around the horizontally disposed axis 19.

The traverses 17 can be provided with a structure such that the traverses serve as a protective element against extraneous bodies exiting sideways and/or as a distance spacer to prevent any danger of injury.

Figure 1:
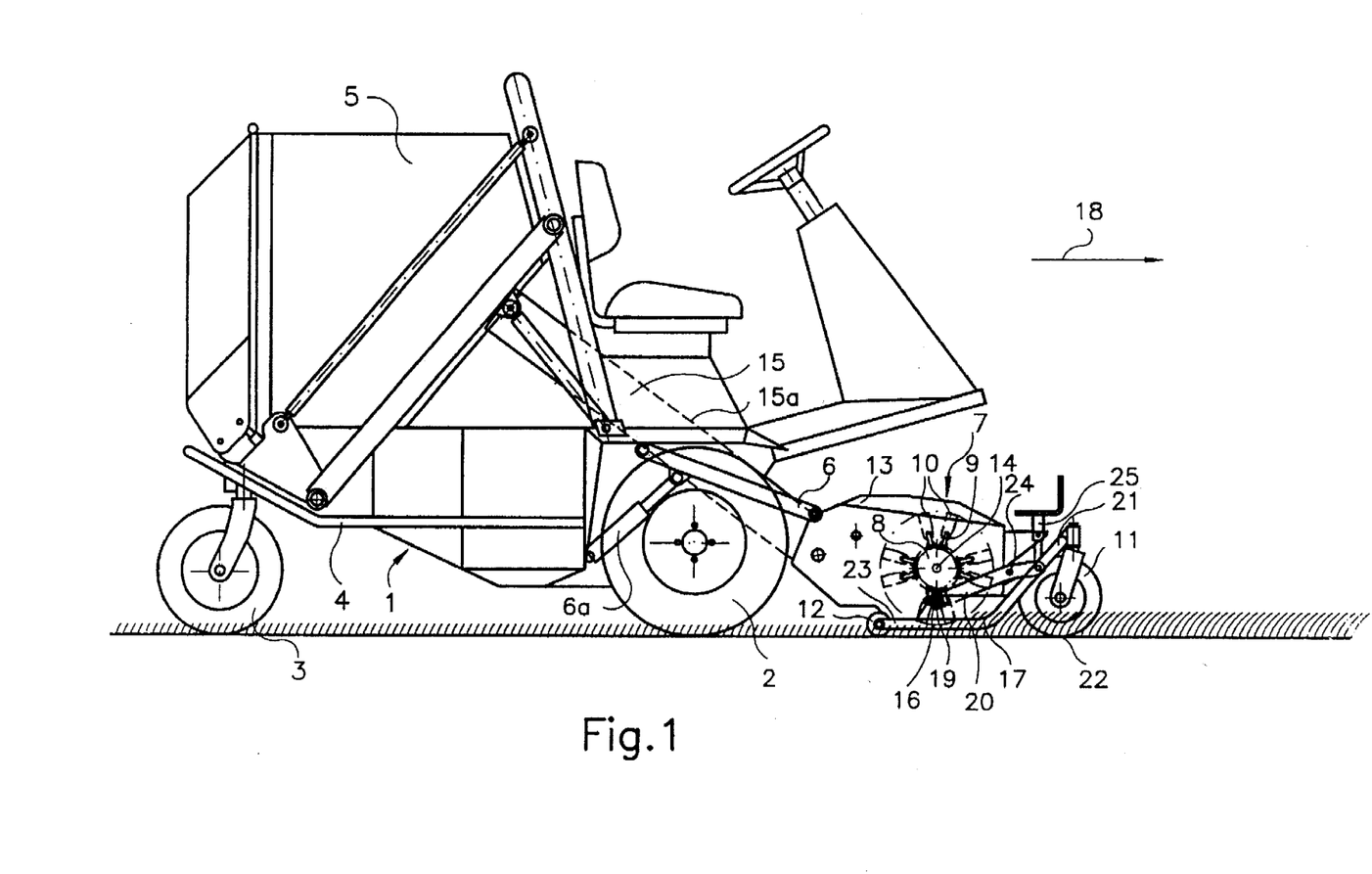
FIG. 1 is a schematic right side elevational view and diagram of a mower machine on a planar terrain;, a schematic left side view is a mirror image of the right side view shown in FIG. 1.

The apparatus for mowing, aerating and/or collecting can be formed as a multi-purpose apparatus. The multi-purpose apparatus allows, in addition to the mowing of green areas, also to be employed as an aerating and/or collecting apparatus. The mower machine according to the exemplified embodiment includes a carrier vehicle 1 with two driven front wheels 2 and a rear running wheel 3. The collection container 5 is disposed at the frame 4 of the mower machine on the back side of the mower machine. The processing device, formed as a mowing assembly 7, is disposed movable in a vertical direction at the front side of the mower machine above the lower pair of guide bars 6. The mowing assembly will generally include a cutter bar, a cutting mechanism, and a cutter deck. The mowing assembly 7 exhibits the rotary driven mower drum 8, where the mower knives 10 are attached through supports 9 at the mower drum 8. The two running wheels 11, adjustable in a vertical direction and disposed swingingly, are located at the front side of the mowing assembly 7. The cutter height of the mower knives 10 of the mowing assembly 7 is adjustable by means of the running wheels 11 together with the roller 12, disposed behind the mowing assembly 7. In the context of the present application, the running wheels 11 and the roller 12 form guide elements. This will be further explained below. The mowing assembly 7 can be raised into a transport position by a lifting device 6a, formed as a hydraulic cylinder.

The transport worm 15, guiding the mowed material to the collection container 5, is disposed at the casing 13 of the mowing assembly 7 above the rotation axis 14 of the mower drum 8. The worm conveyor 15 is rigidly attached to the casing 13 of the mowing assembly 7. The conveyor tube 15a of the worm conveyor 15 forms a further guide for the mowing assembly 7 for pivoting and guiding the mowing assembly 7 relative to the frame 4 of the mower machine.

Figure 2:
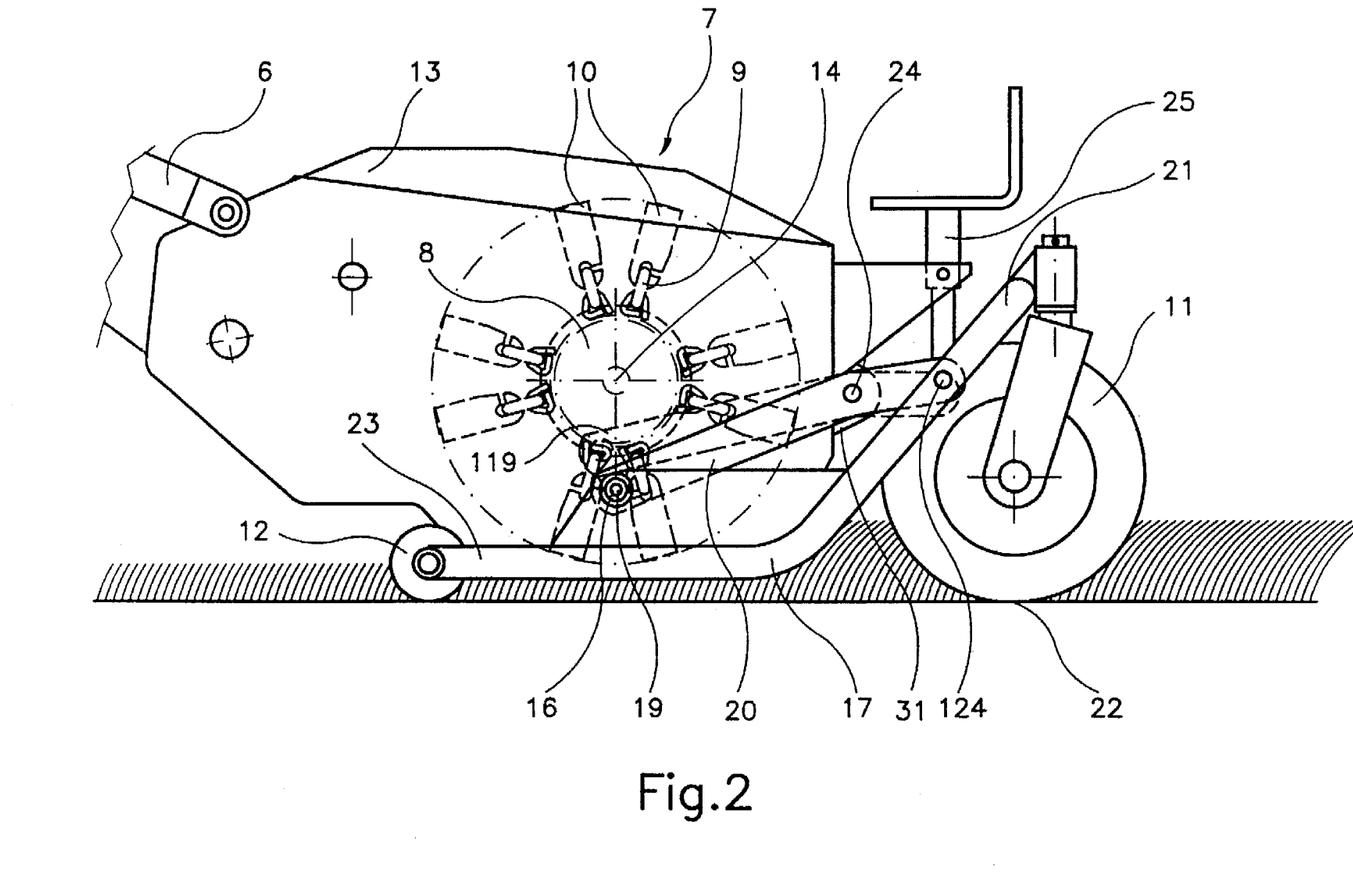
FIG. 2 is a side elevational view of a mowing assembly of the mower machine according to FIG. 1 at an enlarged scale.

The traverses 17 are disposed pivotable relative to the mowing assembly 7 and around an axis 19 on each outer side of the mowing assembly 7 by way of an articulated joint 16, said axis 19 running horizontally and perpendicular to the direction of travel 18 of the carrier vehicle. The axis 19 is disposed below the rotation axis 14 of the mower drum 8 and about perpendicular to the rotation axis 14 and runs through the articulated joints 16. The traverses 17 are in each case disposed with the articulated joints 16 at a swivel arm 20. In other words, the traverses 17 are connected with the articulated joints 16 to the mowing assembly 7. A guide element, which is provided in the exemplified embodiment as a swing wheel 11, and which rolls over the ground surface 22 to be worked on, is disposed at the front side 21 of each traverse 17. In each case also a guide element is disposed at the rear side 23 of the traverses 17, where the guide element is formed as a roller 12 extending over the complete processing and cutting width of the mowing assembly 7 according to the exemplified embodiment. The roller 12 is rotatably supported on each side in the traverses 17 disposed on the outer sides of the mowing assembly 7.

The traverses 17 are in each case hinged at a swivel arm 20 by way of the articulated joints 16, where the swivel arm 20 is rotatably supported at the casing 13 of the mowing assembly 7 by way of the articulated joints 24 as shown in FIG. 2. Furthermore, each swivel arm 20 is adjustable by means of a control mechanism 25 such that the articulated joint 16 is adjustable in a vertical direction in order to be able to set the cutting height level of the mowing assembly 7. In a preferred embodiment shown in FIG. 2 the swirl arm being the two-armed lever 20 is connected at one end to the control mechanism 25 by a joint 124 and at the other end to the traverse 17 by the articulated joint 16. The two-armed lever is pivotably attached to the casing 13 by a joint 24 supported to the casing 13 by a lifting eye 31. Lowering of the operating level of the mowing assembly 7 can be achieved by setting the joint 124 of the control mechanism in a lower position thereby, by rotation of the two-armed lever around the joint 24, the joint 16 comes closer to the rotation axis 14 of the mower drum. A new position 119 of the two-armed lever 20 is shown in FIG. 2 in a dashed line. The two traverses 17 are swivelable independent of each other and relative to each other around the axis 19. Based on this arrangement of the guide elements, provided by the running wheel 11 and the roller 12, relative to the traverses 17 and the previously described arrangement of the traverses 17 at the mowing assembly 7, the common guide frame and vehicle frame is formed by the traverses 17 and the guide elements, formed by the running wheel 11 and the roller 12. Based on this it is accomplished that even on an uneven terrain the front guide element, provided by the running wheel 11, and the rear guide element, provided by the roller 12, always have contact with the ground surface such that the mowing assembly 7 can follow the contour of the ground surface in an optimum way based on this new guiding, as shown in FIGS. 3–6.

Figure 3:
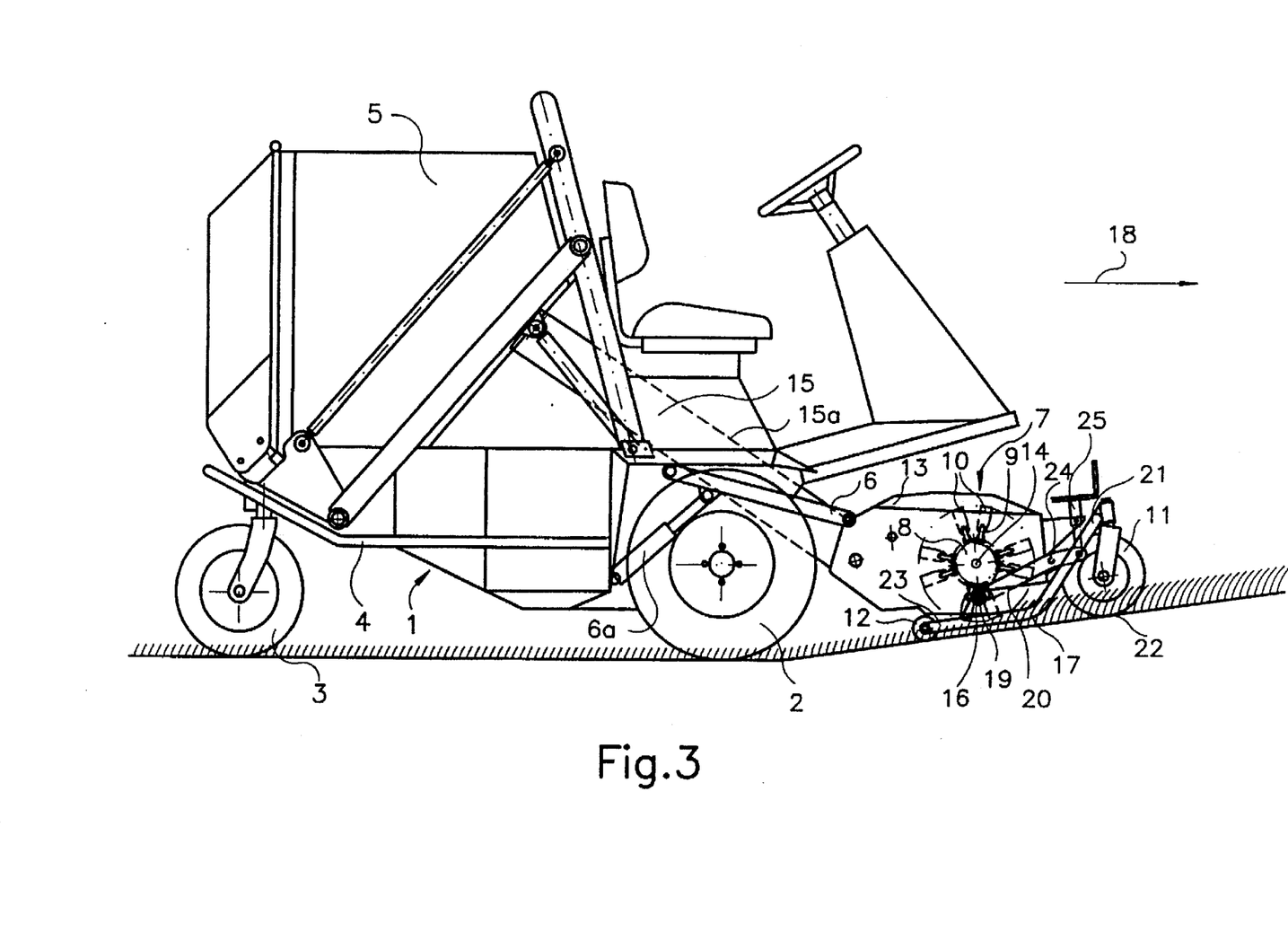
FIG. 3 is a side elevational view of the mower machine on an uneven terrain, wherein the area to be mowed rises.
Figure 4:
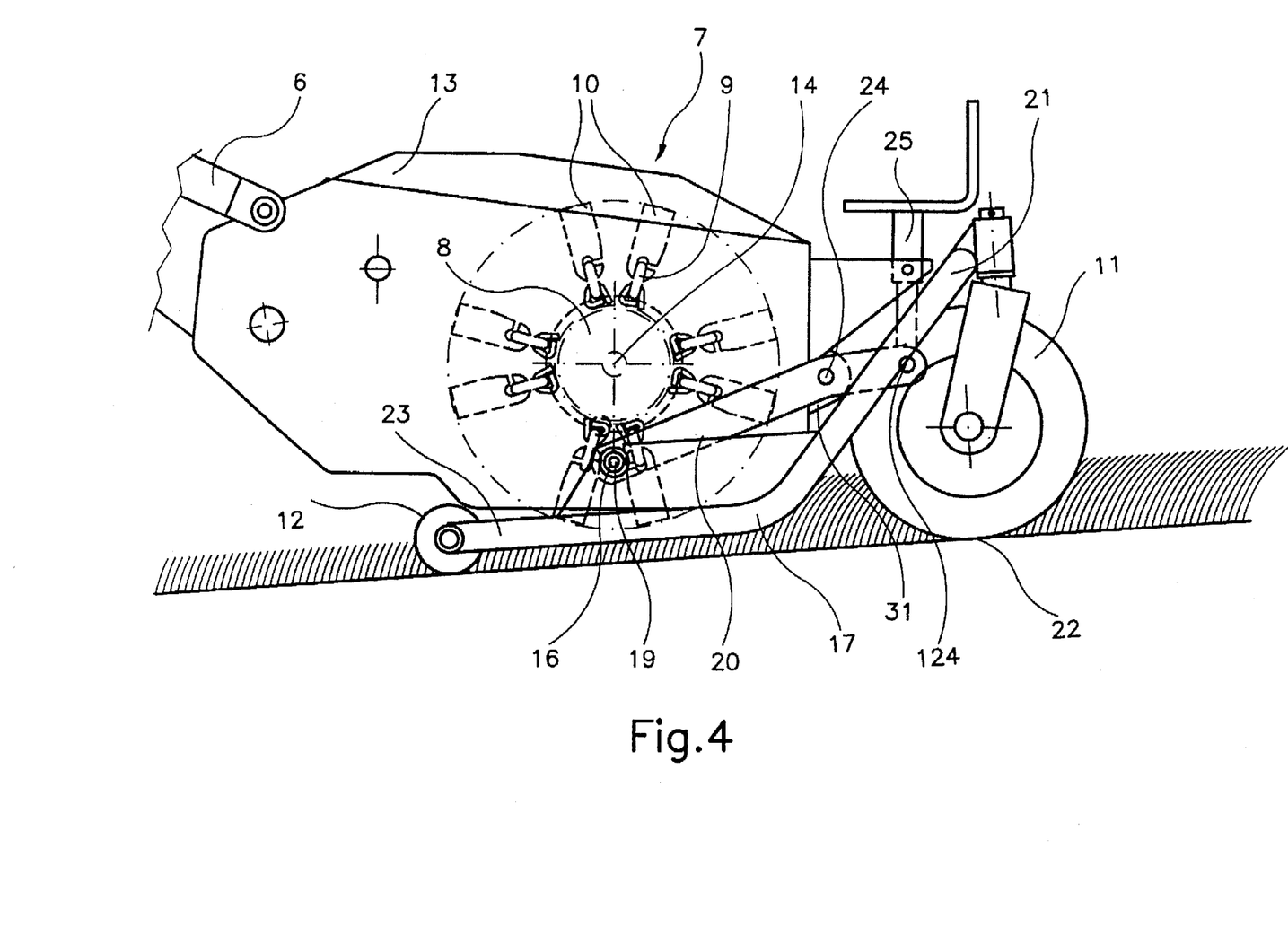
FIG. 4 is a side elevational view of the mowing assembly of the mower machine according to FIG. 3 at an enlarged scale.

According to FIGS. 3 and 4, the mowing assembly 7 is pushed upwardly an ascending side of a rise. Since the running wheel 11 is guided upwardly on the rise, the traverse 17 is swivelled around the axis 19, while the roller 12 maintains contact with the ground. The mowing assembly 7 thus follows to the contour of the ground. Based on the swivelling suspension of the front running wheels 11 and of the ground roller 12 behind the mower drum 8, the mowing assembly 7 is not lifted by the running wheels 11 to the level of the rise of the ground under the running wheels 11.

Figure 5:
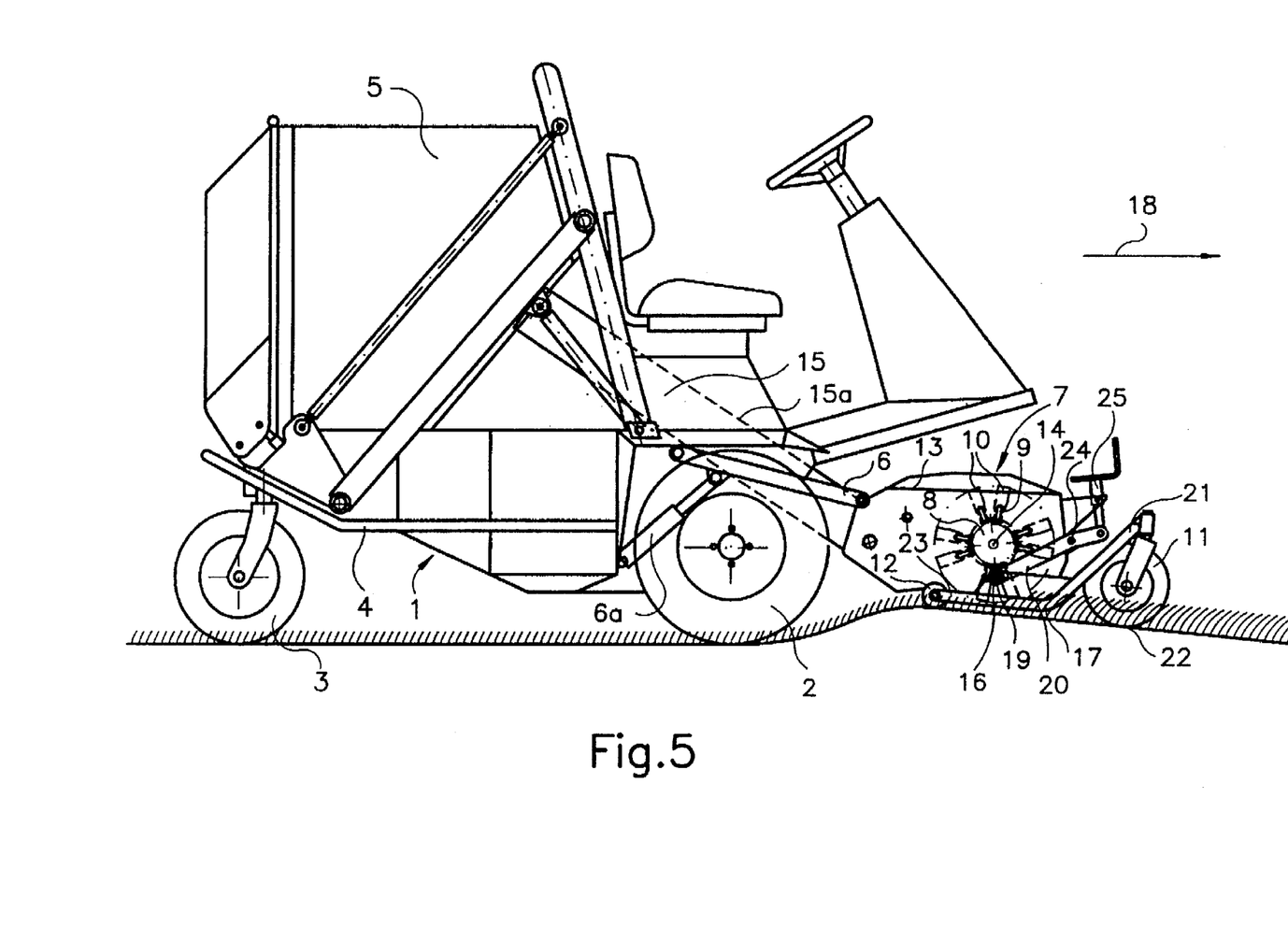
FIG. 5 is a side elevational view of the mower machine on an uneven terrain, wherein the area to be mowed descends.
Figure 6:
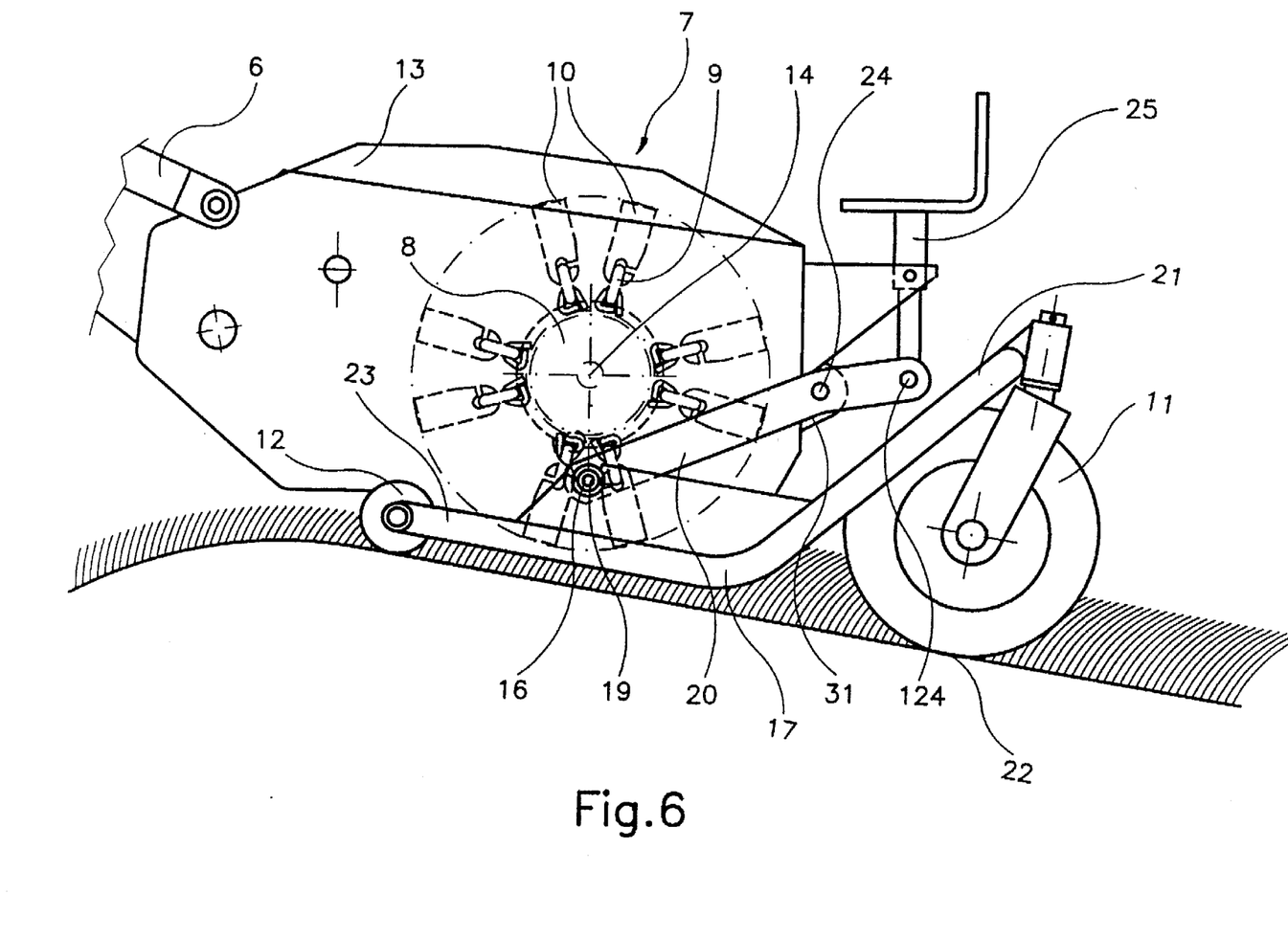
FIG. 6 is a view of the mowing assembly of the mower machine according to FIG. 5 at an enlarged scale.

According to FIGS. 5 and 6, the mowing assembly 7 is pushed downwardly on a descending side of the rise. The running wheel 11 and the roller 12 rest on the ground. The traverses 17 are swivelled in a corresponding way relative to the position of FIGS. 3 and 4.

Thus, the mowing assembly 7 can follow the contour of the ground in an optimum way. The roller 12 and the running wheels 11 exhibit a relatively small distance relative to each other, thereby resulting in a small wheel base. Based on the swivelling suspension of the traverses 17, the vehicle frame for the mowing assembly 7 also follows an uneven contour of the ground and an uneven ground surface.

In addition, the traverse 17 itself is formed such that it reaches closely to the ground surface 22 in the region of the mower drum 8. A good protection against sideways exiting extraneous bodies is achieved based on the traverses 17 being able to follow optimally to the contour of the ground. Thus, the traverses 17 operate as a protective element against sideways exiting extraneous bodies. In addition, the danger of injury to persons stepping to the side of the machine is very small because the traverses 17 serve as a distance spacer against the dangers of injury. It is also possible to dispose parts at the traverses 17, where these parts are operating as protective elements and as distance spacers.

Based on the new inventive arrangement of disposing the front depth level guide elements 11, provided by the running wheel 11, and the rear depth level guide elements, provided by the roller 12, in each case at a common, swivelably suspended traverse 17, there results that the vertical level guiding of the mowing assembly 7 is hardly influenced by the motions of the vehicle based on an unevenness of the ground.

It will be understood that each of the elements, or two or more together, may find a useful application in other types of mowing apparatus and devices, differing from the types described above.

While the invention has been illustrated and described as embodied in the context of an apparatus for mowing, aerating, and/or collecting, it is not intended to be limited to the detail shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for mowing and for at least one of aerating and collecting comprising a frame;
    a cultivation device having a casing and disposed movably in a vertical direction relative to the frame;
    an adjustable front guide element having a first continuous contact with a ground surface, wherein the adjustable front guide element is disposed in front of the cultivation device;
    a rear guide element having a second continuous contact with the ground surface, wherein the rear guide element is disposed in rear of the cultivation device, wherein the adjustable front guide element and the rear guide element set an operating level of the cultivation device;
    a control mechanism attached to the casing;
    an axle running perpendicular to a direction of travel of the cultivation device and supported by the control mechanism in an area of the cultivation device such that a vertical position of the axle is set with the control mechanism;
    a first common traverse disposed between the adjustable front guide element and the rear guide element and pivotably attached to the control mechanism for pivoting around the axle, wherein the adjustable front guide element and the rear guide element are rotatably supported by the first common traverse.

2. The apparatus according to claim 1, wherein the cultivation device is a mowing assembly;
    wherein the control mechanism is provided with a two-armed lever pivotably attached to the casing around a first axis with a first arm of the two-armed lever attached to a movably joint of the control mechanism and with a second arm of the two-armed lever supporting the second axis.

3. The apparatus according to claim 2, further comprising a mower drum rotatably attached to the casing, wherein the second axis is disposed horizontally, and wherein the second axis coincides with a rotation axis of the mower drum.

4. The apparatus according to claim 2, further comprising a mower drum rotatably attached to the casing, wherein the second axis is disposed below a rotation axis of the mower drum and about vertically below the rotation axis.

5. The apparatus according to claim 2, wherein the operating level of the cultivation device is a cutter level, and wherein a position of the second axis is adjustable in a vertical direction for an adjustment of the cutter level.

6. The apparatus according to claim 1, wherein the first common traverse is hinged in a bearing representing the second axis located at an end of the second arm of the two-armed lever pivoting around the first axis, wherein a position of the end of the second arm is adjustable in a vertical direction with the control mechanism.

7. The apparatus according to claim 1, further comprising a second common traverse disposed between a second adjustable front guide element and a second rear guide element and pivotably attached for pivoting around the second axis, wherein the second adjustable front guide element and the second rear guide element are rotatably supported by the second common traverse, and wherein the first common traverse and the second common traverse are pivotable independent of each other around the second axis disposed horizontally.

8. The apparatus according to claim 1, wherein the first traverse serves as a protective element against extraneous bodies exiting sideways and as a distance spacer to prevent any danger of injury.

9. An apparatus for mowing and for at least one of aerating and collecting comprising a cultivation device having a casing defining a first vertical axis thereof;

a control mechanism attached to the casing; a second axis running perpendicular to a direction of travel of the cultivation device and supported by the control mechanism such that a vertical position of the second axis can be set with the control mechanism;

a front guide element disposed in front of the cultivation device;

a rear guide element disposed in rear of the cultivation device;

a common traverse disposed between the front guide element and the rear guide element and pivotably attached to the control mechanism for pivoting around the second axis, wherein the front guide element and the rear guide element are rotatably supported by the common traverse, and wherein the second axis is disposed in an area of the cultivation device.

10. The apparatus according to claim 9, further comprising means for adjusting a vertical level of the cultivation device relative to the frame;

wherein the cultivation device is a mowing assembly;

wherein the control mechanism is provided with a two-armed lever attached pivotably around the first axis, wherein a first arm of the two-armed lever is employed for position adjustment and wherein a second arm of the two-armed lever supports the second axis.

11. An apparatus for mowing and for at least one of aerating and collecting including a cultivation device formed as a mowing assembly, and disposed movably in a vertical direction relative to a frame, and with guide elements disposed in front of and behind the cultivation device, and adjustable relative to the cultivation device for setting an operating level of the cultivation device, wherein the guide elements, disposed in front of the cultivation device and the guide elements disposed behind the cultivation device are disposed on at least one common traverse (17), wherein the traverse (17) is disposed between the guide elements (11, 12) at the cultivation device (7) and is pivotable in an upwardly aligned plane around a horizontally disposed axis (19), running perpendicular to a direction of travel (18), wherein said cultivation device is pivotable relative to said frame through said traverse.

12. The apparatus according to claim 11, wherein the horizontally disposed axis (19) coincides with a rotation axis (14) of a mower drum (8).

13. The apparatus according to claim 11, wherein the axis (19) is disposed below the rotation axis (14) of the mower drum (8) and about vertically relative to the rotation axis (14).

14. The apparatus according to claim 11, wherein the operating level set is a cutter level, and wherein the axis (19) is adjustable in a vertical direction for an adjustment of the cutter level.

15. The apparatus according to claim 11, wherein the traverses (17) are hinged in each case at a swivel arm (20), wherein the swivel arm (20) is adjustable in a vertical direction with a control mechanism (25).

16. The apparatus according to claim 11, wherein the traverses (17) are pivotable independent of each other around the horizontally disposed axis (19).

17. The apparatus according to claim 11, wherein the traverses (17) serve as at least one of a protective element against extraneous bodies exiting sideways and as a distance spacer to prevent any danger of injury.

* * * * *